US011187405B2

(12) United States Patent
Davis

(10) Patent No.: US 11,187,405 B2
(45) Date of Patent: Nov. 30, 2021

(54) SYSTEM AND METHOD FOR CELL PHONE CASES WITH CHARGING PORT ILLUMINATION

(71) Applicant: Sean Davis, Lawrenceville, GA (US)

(72) Inventor: Sean Davis, Lawrenceville, GA (US)

( * ) Notice: Subject to any disclaimer, the term of this patent is extended or adjusted under 35 U.S.C. 154(b) by 0 days.

(21) Appl. No.: 16/105,967

(22) Filed: Aug. 20, 2018

(65) Prior Publication Data

US 2019/0323701 A1    Oct. 24, 2019

Related U.S. Application Data

(60) Provisional application No. 62/547,653, filed on Aug. 18, 2017.

(51) Int. Cl.
| | | |
|---|---|---|
| *F21V 33/00* | (2006.01) | |
| *H04B 1/3888* | (2015.01) | |
| *H04M 1/02* | (2006.01) | |
| *H02J 7/00* | (2006.01) | |
| *F21V 23/04* | (2006.01) | |
| *F21Y 115/10* | (2016.01) | |
| *H05B 47/16* | (2020.01) | |

(52) U.S. Cl.
CPC .......... *F21V 33/0004* (2013.01); *F21V 23/04* (2013.01); *H02J 7/0045* (2013.01); *H04B 1/3888* (2013.01); *H04M 1/0202* (2013.01); *F21Y 2115/10* (2016.08); *H05B 47/16* (2020.01)

(58) Field of Classification Search
CPC .. H02J 7/0045; H04B 1/3888; H04M 1/0202; H05B 37/0281; F21V 33/0004; F21V 23/04
See application file for complete search history.

(56) References Cited

U.S. PATENT DOCUMENTS

| | | | | |
|---|---|---|---|---|
| 6,954,658 B2* | 10/2005 | Engstrom | ............... | H04M 1/22 340/815.4 |
| 6,979,210 B2* | 12/2005 | Regen | .................. | H01R 13/629 439/131 |
| 8,428,644 B1* | 4/2013 | Harooni | ............... | H04B 1/3888 362/551 |
| 9,057,490 B2* | 6/2015 | Sharrah | ..................... | F21L 4/04 |
| 9,294,601 B2* | 3/2016 | Hammond | ............. | H04M 1/18 |
| 9,442,346 B2* | 9/2016 | Gantz | ............. | H04N 5/232411 |
| 9,832,297 B2* | 11/2017 | Liu | ......................... | H04M 1/22 |
| 2013/0260825 A1* | 10/2013 | Hagenstad | .......... | H04M 1/0202 455/556.1 |

(Continued)

*Primary Examiner* — Arman B Fallahkhair
(74) *Attorney, Agent, or Firm* — Charlena Thorpe, Esq.; Incorporating Innovation LLC

(57) ABSTRACT

Implementations of a system and method for cell phone cases with charging port illumination are provided. In some implementations, the system for cell phone cases with charging port illumination comprises a circuitry comprising a battery, a switch, and a light emitting diode (LED). In some implementations, the circuitry is configured to securely attach to a cell phone case. In some implementations, the circuitry is configured to illuminate a charging port opening of the cell phone case.

In some implementations, the method for cell phone cases with charging port illumination comprises securely attaching the circuitry to the cell phone case. In some implementations, the method further comprises illuminating the charging port opening of the cell phone case with the circuitry.

9 Claims, 8 Drawing Sheets

(56) References Cited

U.S. PATENT DOCUMENTS

2016/0099596 A1* 4/2016 Chien .................. H02J 7/0052
  368/10
2016/0172796 A1* 6/2016 Humphreys ....... H01R 13/7175
  439/620.21
2016/0241067 A1* 8/2016 Miracle ............. H01R 13/7175
2017/0324438 A1* 11/2017 Mischel ............... H04N 5/2257

* cited by examiner

SYSTEM AND METHOD FOR CELL PHONE CASES WITH CHARGING PORT ILLUMINATION

CROSS REFERENCE TO RELATED APPLICATION

This application claims the benefit of U.S. Patent Application Ser. No. 62/547,653, which was filed on Aug. 18, 2017, and is incorporated herein by reference in its entirety.

TECHNICAL FIELD

This disclosure relates to implementations of a system and method for cell phone cases with charging port illumination.

BACKGROUND

Cell phone cases, such as shown in FIGS. 1A and 1B, are very popular for use with cell phones. For example, a cell phone case may be used to protect a cell phone from damage and/or to decorate or otherwise enhance the appearance of a cell phone.

As shown in FIG. 1B, cell phone cases usually include an opening for access to the charging port of an encased cell phone to connect a cell phone charger. However, in darkness or other low light conditions, it is often difficult to see the cell phone charging port to connect the charger to charge the cell phone. Existing cell phone cases, such as shown in FIGS. 1A and 1B, often add to the difficulty to see the charging port of an encased cell phone through the case charging port opening in low light conditions.

DETAILED DESCRIPTION

Implementations of a system and method for cell phone cases with charging port illumination are provided. In some implementations, the system for cell phone cases with charging port illumination comprises a circuitry comprising a battery, a switch, and a light emitting diode (LED). In some implementations, the circuitry is configured to securely attach to a cell phone case. In some implementations, the circuitry is configured to illuminate a charging port opening of the cell phone case.

In some implementations, the method for cell phone cases with charging port illumination comprises securely attaching the circuitry to the cell phone case. In some implementations, the method further comprises illuminating the charging port opening of the cell phone case with the circuitry.

In some implementations, the system for cell phone cases with charging port illumination is configured to attach to a cell phone case. In some implementations, the system includes a cell phone case. In some implementations, the system is configured to illuminate a charging port opening of the cell phone case.

In this way, in some implementations, the system provides illumination of the charging port of a cell phone encased in a cell phone case that includes the system. Furthermore in this way, in some implementations, the illumination provided by the system allows a user to see the charging port of the encased call phone in darkness or other low light conditions.

Figure 1A:
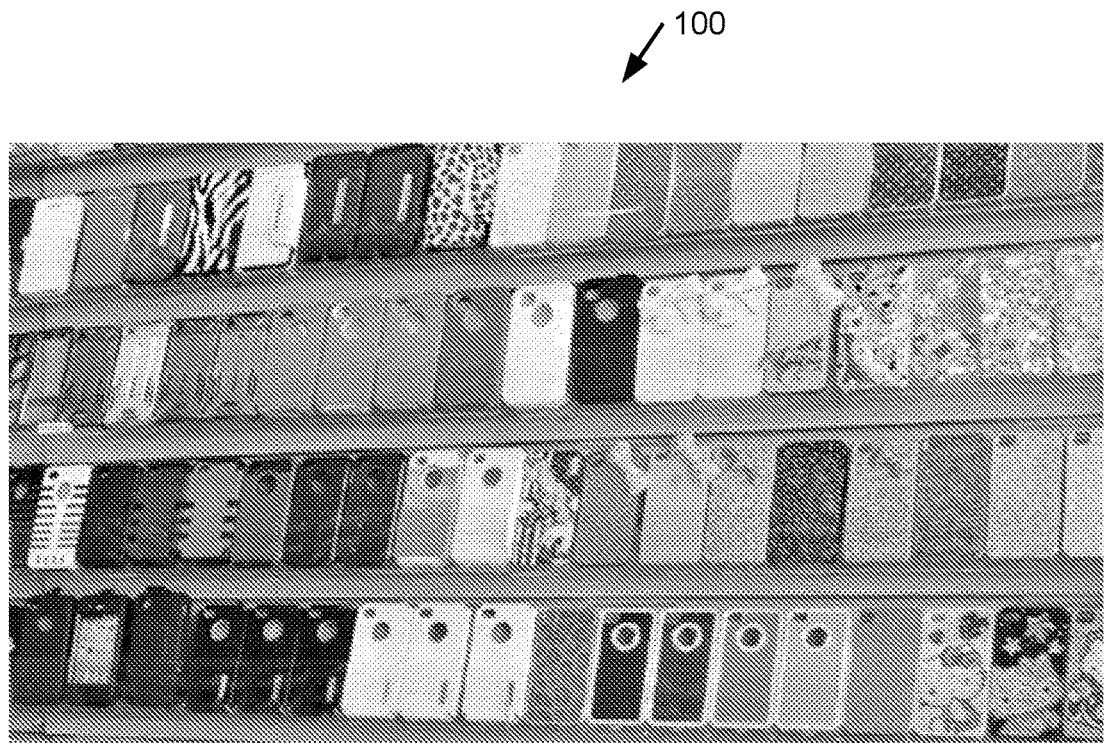
FIGS. 1A and 1B illustrate examples of existing cell phone cases.
Figure 1B:
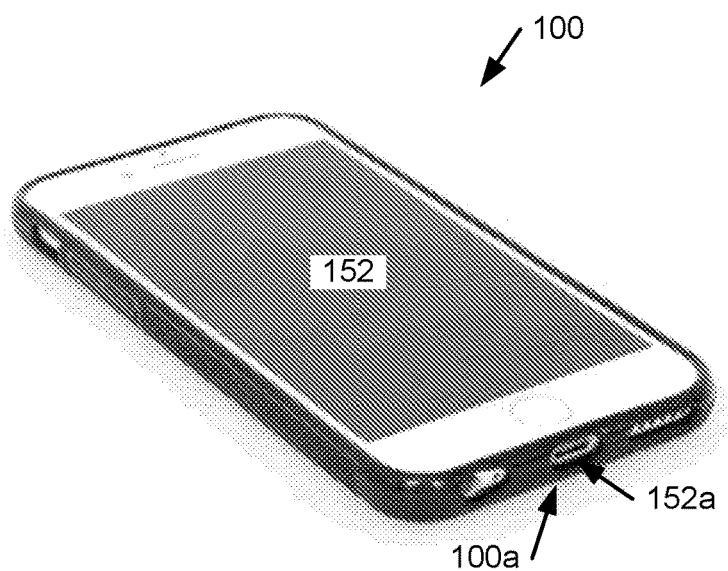

FIGS. 1A and 1B illustrate examples of existing cell phone cases 100. Such cell phone cases 100 are very popular for use with cell phones 152. For example, a cell phone case 100 may be used to protect a cell phone 152 from damage and/or to decorate or otherwise enhance the appearance of a cell phone 152.

As shown in FIG. 1B, cell phone cases 100 usually include an opening 100a for access to the charging port 152a of an encased cell phone 152 to connect a cell phone charger (not shown). However, in darkness or other low light conditions, it is often difficult to see the cell phone charging port 152a to connect the charger to charge the cell phone 152. Existing cell phone cases, such as shown in FIGS. 1A and 1B, often add to the difficulty to see the charging port 152a of an encased cell phone 152 through the case charging port opening 100a in low light conditions.

In some implementations, a cell phone as described herein, such as the cell phone 152, 252, can be any suitable cell phone, cellphone, cellular phone, mobile phone, or similar device.

Figure 2A:
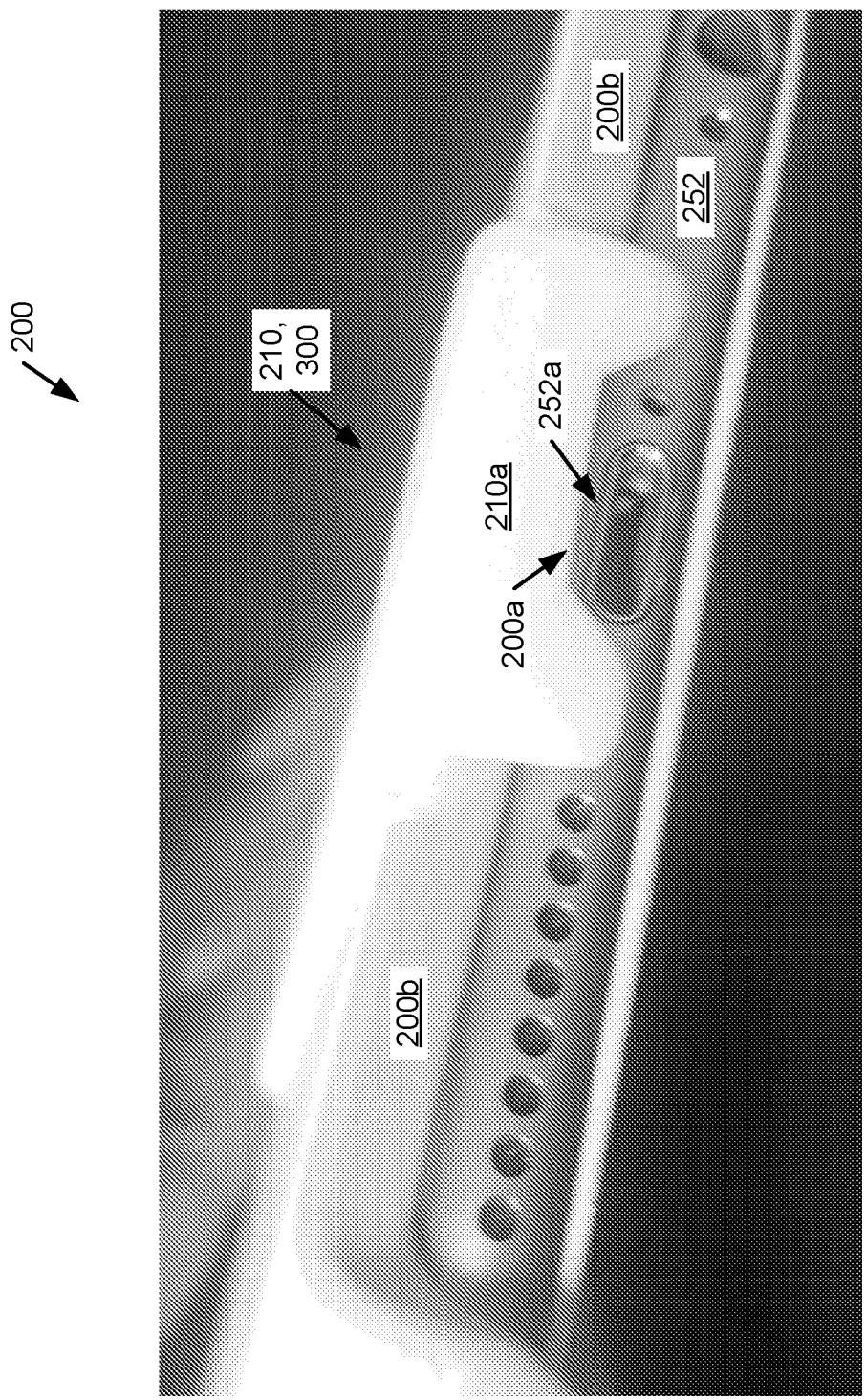
FIGS. 2A and 2B illustrate a bottom view of an implementation of an example cell phone case with charging port illumination according to the present disclosure.
Figure 2B:
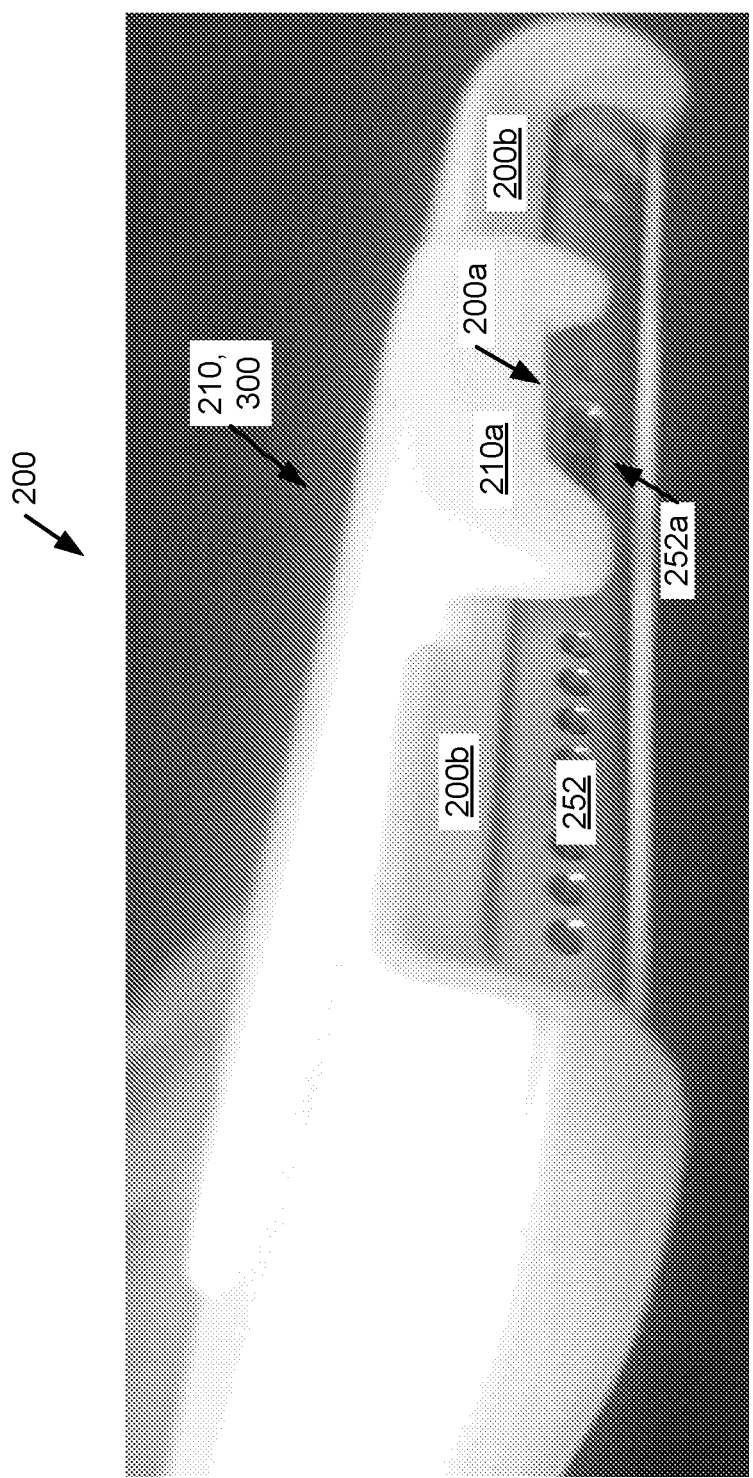

FIGS. 2A and 2B illustrate a bottom view of an implementation of an example cell phone case 200 with charging port 200a illumination according to the present disclosure.

As further described below with reference to FIGS. 3A-3C and FIGS. 4A and 4B respectively, in some implementations, the cell phone case 200 comprises circuitry 300 embodied in the cell phone case 200 that causes light-emitting diode ("LED") to illuminate the opening 200a and the charging port 252a.

In some implementations, the cell phone case 200 is configured to encase a cell phone 252. In some implementations, the charging port 252a of an encased cell phone 252 is adjacent to the case opening 200a.

In some implementations, the charging port 252a of the encased cell phone 252 is accessible through the case opening 200a.

In some implementations, the cell phone case 200 is configured to illuminate the charging port 252a of the encased cell phone 252 when the circuitry 300 illuminates the case opening 200a.

In some implementations, the cell phone 252 may be the same or similar to the cell phone 152 referred to above.

Figure 3A:
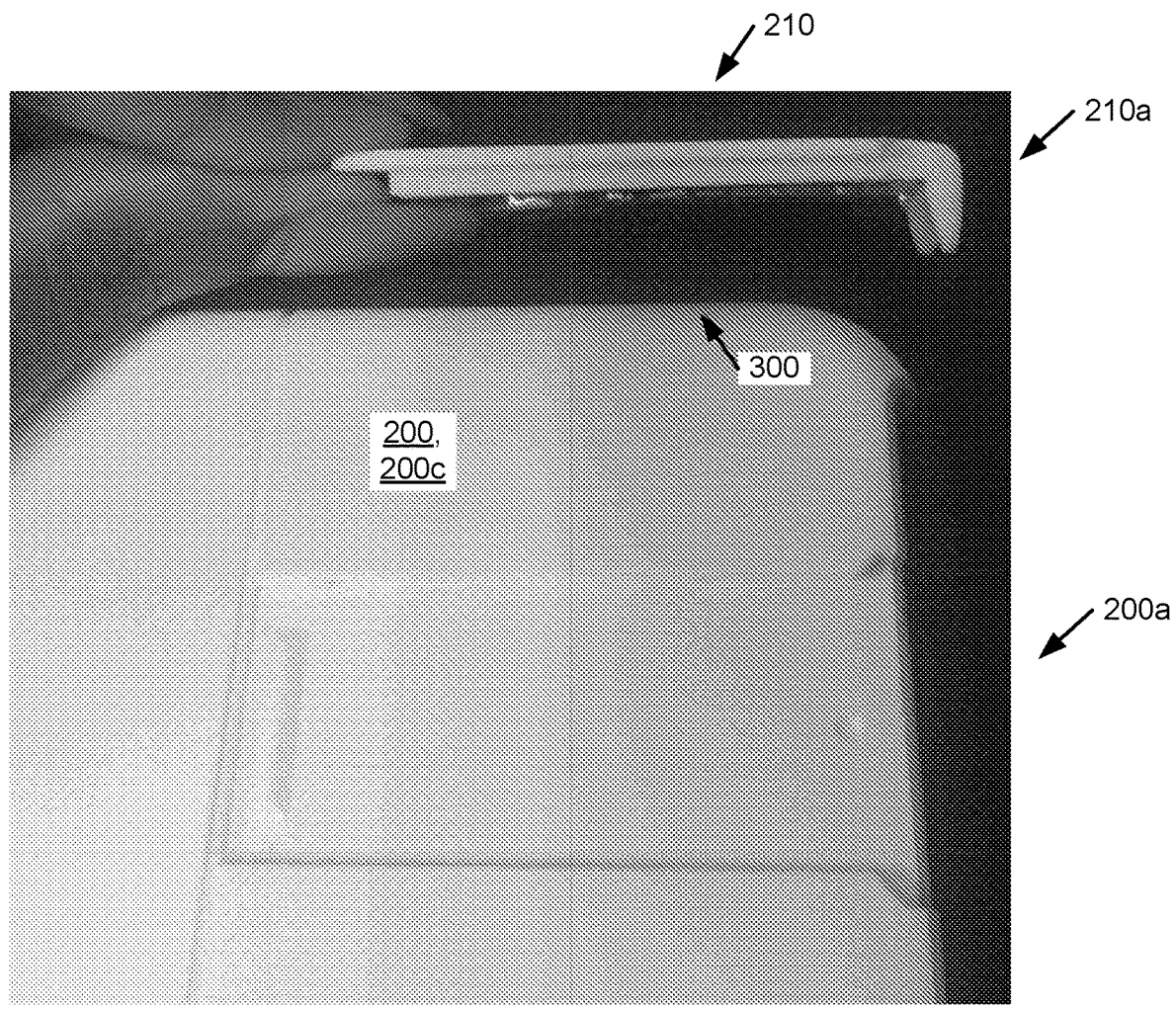
FIGS. 3A-3C illustrate a back view of an implementation of an example cell phone case with charging port illumination according to the present disclosure.
Figure 3B:
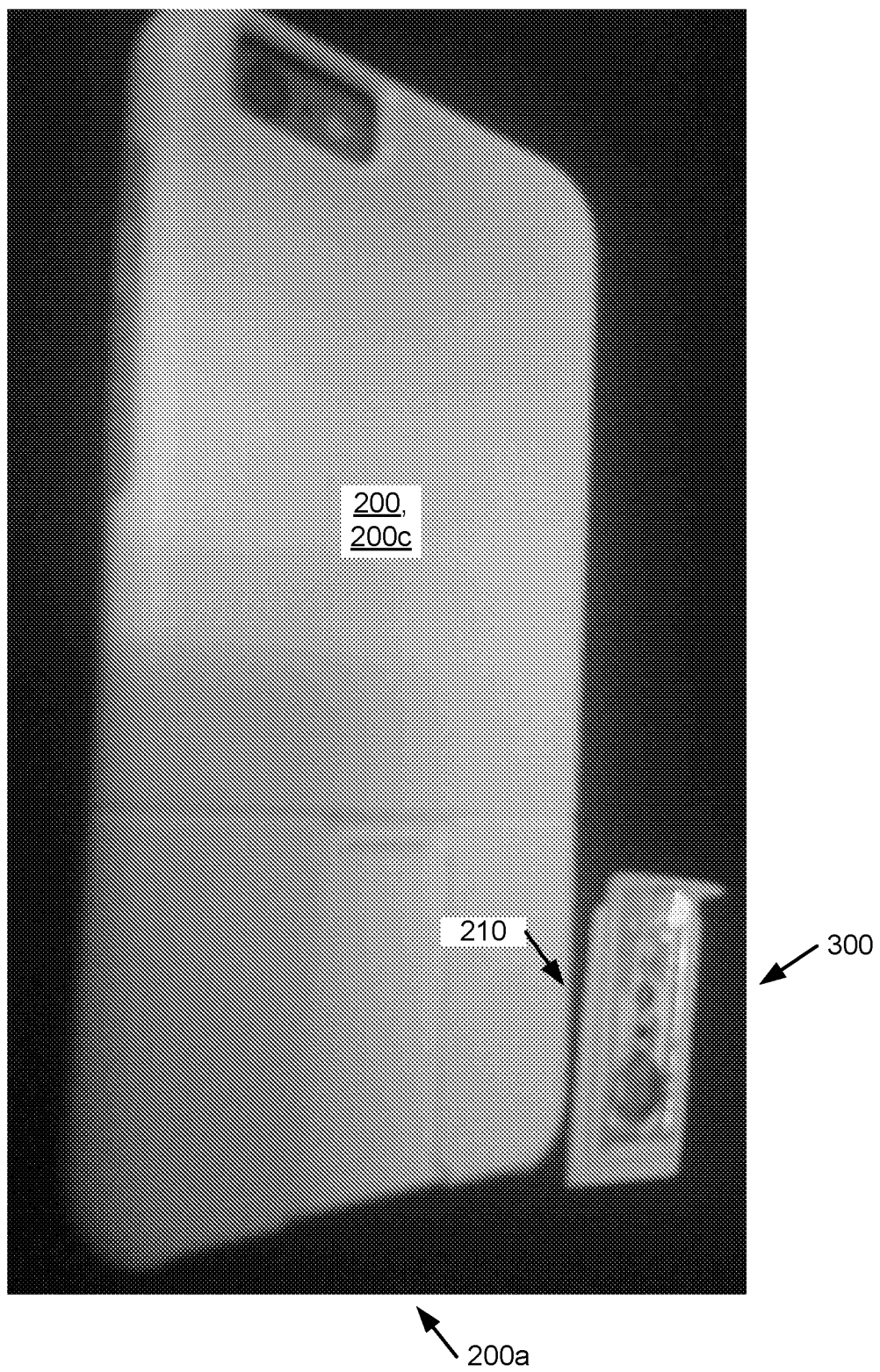
Figure 3C:
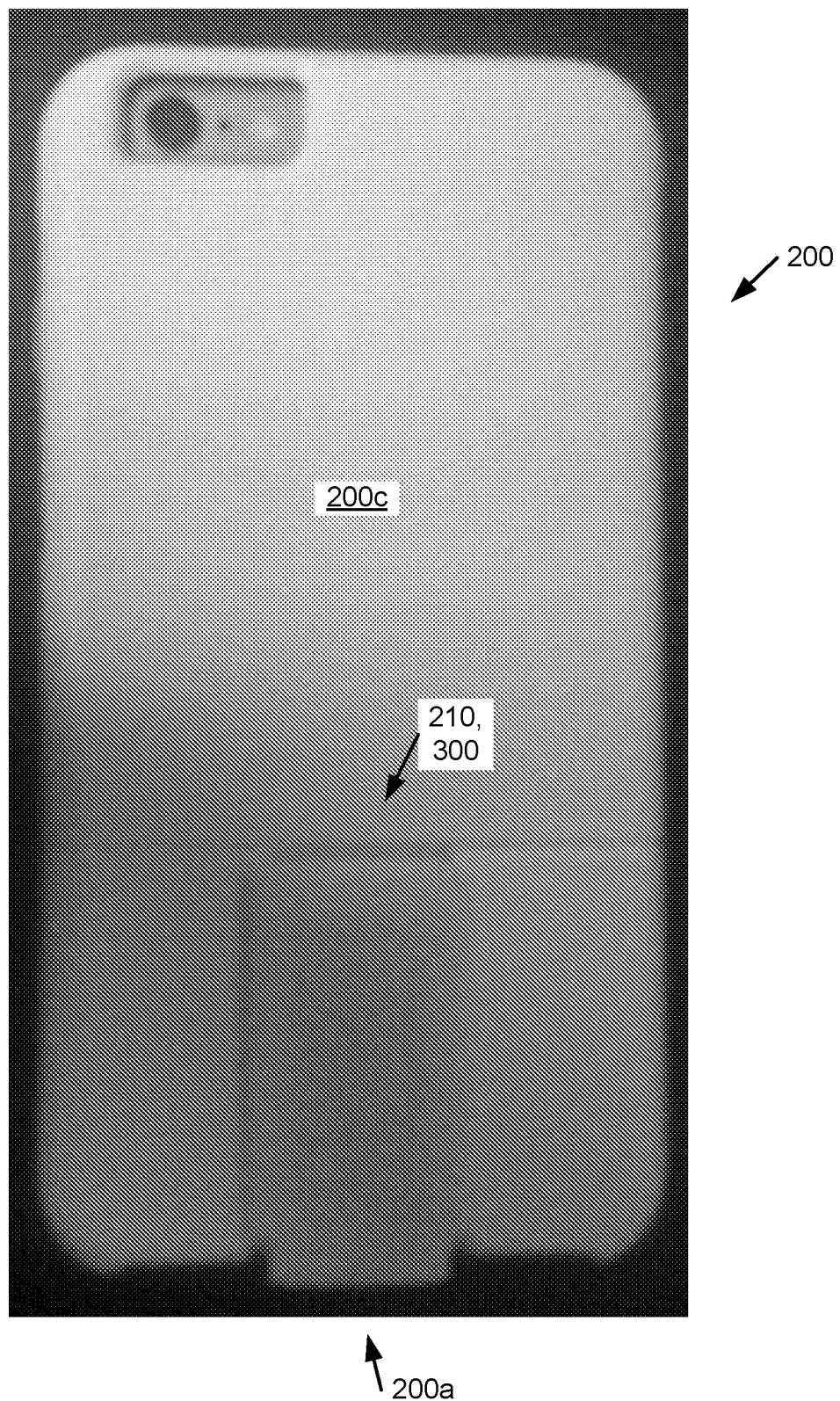

FIGS. 3A-3C illustrate a back view of an implementation of an example cell phone case 200 with charging port 200a illumination according to the present disclosure.

In some implementations, circuitry 300 is securely attached to or otherwise embodied in the cell phone case 200. In some implementations, the circuitry 300 causes an LED to illuminate the cell phone case charging port opening 200a and the cell phone charging port 252a.

As further described below with respect to FIGS. 4A and 4B, in some implementations, the circuitry 300 comprises a battery and a switched LED.

In some implementations, when the user presses a pushbutton on the cell phone case 200, the circuitry 300 switches the LED on or off.

In some implementations, the circuitry 300 is configured such that when a user presses a pushbutton on the cell phone case 200, the LED turns on, and when the user presses the pushbutton again, the LED turns off. In some implementations, this cycle is repeated for each press of the pushbutton.

In some implementations, the circuitry 300 is configured such that when the LED is turned on, a timer starts and the LED is turned off after a preset or predetermined time.

In some implementations, the circuitry 300 is configured to securely attach to the cell phone case 200 in a position so that light emitted from the LED of the circuitry 300 illuminates a cell phone charging port opening 200a of the cell phone case 200.

In some implementations, the circuitry 300 is configured to securely attach to the cell phone case 200 adjacent to the charging port opening 200a.

In some implementations, the circuitry 300 is configured to securely and removably attach to the cell phone case 200.

In some implementations, the circuitry 300 is an integrated part of the cell phone case 200.

In some implementations, the circuitry 300 is composed on a piece of material 210 that is configured to securely and removably attach to the cell phone case 200.

In some implementations, the piece of material 210 is a part of the cell phone case 200.

In some implementations, as shown in FIGS. 2A and 2B, the charging port opening 200a is located on the bottom side of the cell phone case 200. In some implementations, as shown in FIGS. 3A-3C, the piece of material 210 is a flat rectangular panel configured to securely attach to the back side of the cell phone case 200 adjacent to the charging port opening 200a with the circuitry 300 facing the back side of the cell phone case 200 and covered by the piece of material 210.

In some implementations, the piece of material 210 further comprises an extension 210a from the flat rectangular panel that extends from the back side of the cell phone case 200 around to the bottom side of the cell phone case 200 and is configured to transmit light emitted from the LED to the bottom side of the cell phone case 200 to illuminate the charging port opening 200a.

Figure 4A:
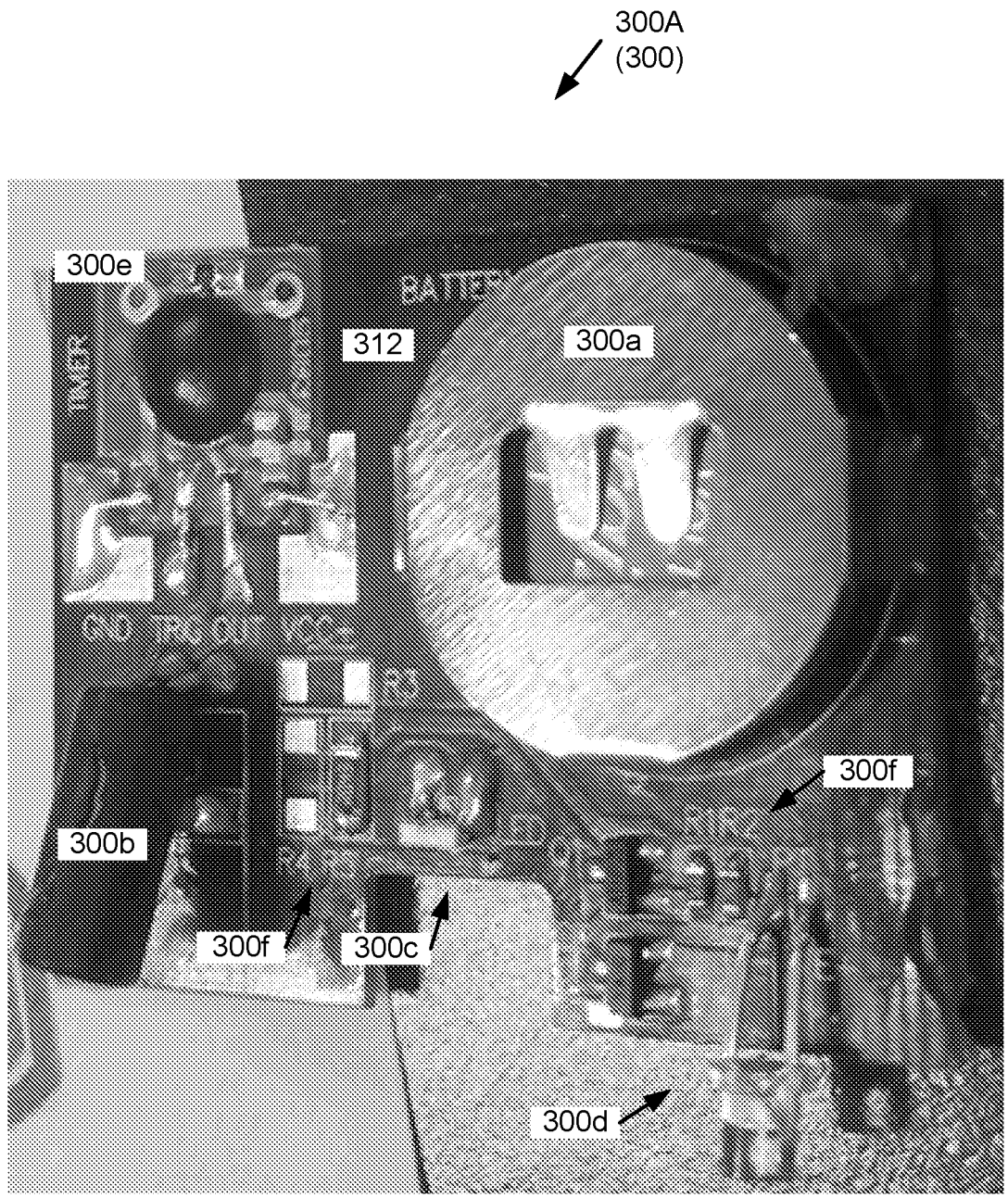
FIG. 4A illustrates an implementation of an example circuitry for a cell phone case with charging port illumination according to the present disclosure, such as the cell phone case shown in FIGS. 2A-2B and 3A-3C.
Figure 4B:
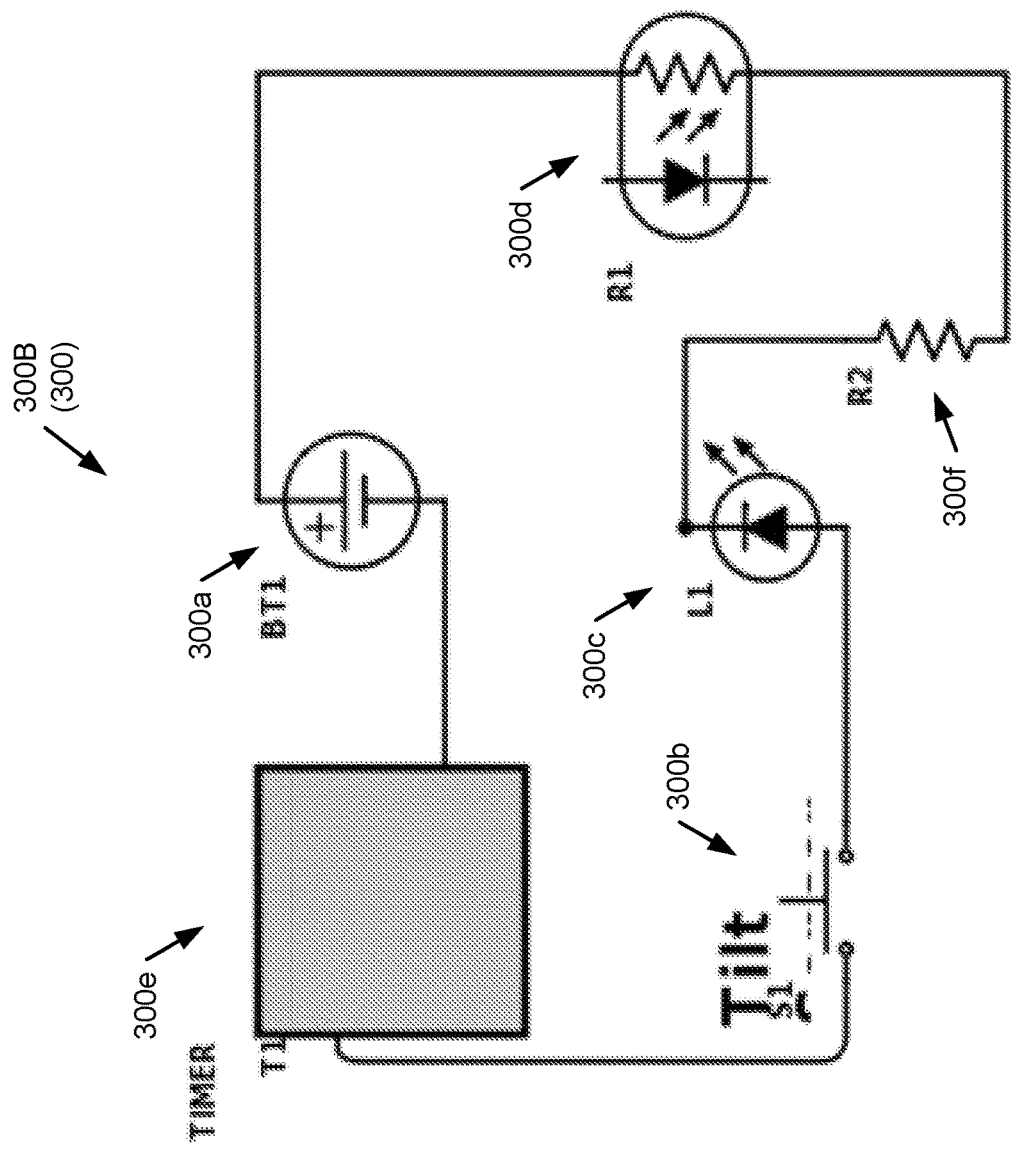
FIG. 4B illustrates an example circuit diagram of the circuitry for a cell phone case with charging port illumination shown in FIG. 4A.

FIG. 4A illustrates an implementation 300A of the circuitry 300 for the cell phone case 200 with charging port 200a illumination according to the present disclosure, such as the cell phone case 200 shown in FIGS. 2A-2B and 3A-3C. FIG. 4B illustrates an example circuit diagram 300B of the circuitry 300 shown in FIG. 4A.

In some implementations, the circuitry 300 comprises a battery 300a, a switch 300b, and an LED 300c. In some implementations, the circuitry 300 further comprises a timer 300d. In some implementations, the circuitry 300 further comprises additional components such as one or more resistors 300e.

In some implementations, the foregoing components of the circuitry 300 are electrically connected together so that the battery 300a powers the LED 300c to emit light when the switch 300b is operated.

In some implementations, as shown in FIG. 4A, the circuitry 300 is composed on a circuit board 312.

In some implementations, as described further above for FIGS. 3A-3C, the circuitry 300 is composed on a piece of material 210 that is configured to securely and removably attach to the cell phone case 200.

In some implementations, the switch 300b is a tactile switch. In some implementations, the switch 300b is a normally open switch. In some implementations, the switch 300b is a pushbutton switch. In some implementations, the switch 300b may be any suitable switch to perform the functionality disclosed herein.

In some implementations, the circuitry 300 powers the LED 300c when the switch 300b is pressed.

In some implementations, the circuitry 300 continues to power the LED 300c after the switch 300b is pressed until the switch 300b is pressed again.

In some implementations, the timer 300d is configured to give the switch 300b a latch functionality in the circuitry 300.

For example, in some implementations, when the switch 300b is pressed, the timer 300d causes the circuitry 300 to power the LED 300c. In some implementations, when the switch 300b is pressed again, the timer 300d causes the circuitry 300 to stop powering the LED 300c.

In some implementations, the LED 300c stays powered on by the circuitry 300 so long as the switch 300b is depressed. In some implementations, the LED 300c is then powered off by the circuitry 300 when pressure is released from the switch 300b.

In some implementations, the LED 300c is powered or not powered by the circuitry 300 by any other suitable configuration or functioning of the components of the circuitry 300.

In some implementations, the switch 300b is configured to operate by pressing the piece of material 210 while the piece of material 210 is attached to the cell phone case 200.

In some implementations, the circuitry 300 can be embodied in the cell phone case 200. In some implementations, as shown in FIGS. 2A and 2B, the circuitry 300 can be embodied in the piece of material being a removable slot 210 on a modular cell phone case 200 (e.g., the Otterbox Universe Case). In some implementations, the circuitry 300 can be embodied in any other suitable cell phone case 200. In some implementations, the circuitry 300 can be securely attached directly to a cell phone 252 to illuminate the charging port 252a of the cell phone 252. In some implementations, the circuitry 300 can be securely attached to any other suitable cell phone case 100 to illuminate the charging port 152a of a cell phone 152.

In some implementations, the cell phone case 200 with charging port 200a illumination can have any suitable dimensions.

In some implementations, the cell phone case 200 with charging port 200a illumination is composed of any suitable materials.

In some implementations, the cell phone case 200 with charging port 200a illumination can have any suitable appearance.

In some implementations, an example use of the cell phone case 200 with charging port 200a illumination comprises placing a cell phone 252 in the cell phone case 200 and causing the circuitry 300 to power the LED 300c to illuminate the opening 200a and the cell phone charging port 252a to access the charging port 252a.

In some implementations, causing the circuitry 300 to power the LED 300c comprises pressing a pushbutton on the cell phone case 200.

In some implementations, accessing the cell phone charging port 252a comprises connecting a charging cable to the cell phone charging port 252a. In some implementations, accessing the cell phone charging port 252a comprises disconnecting a charging cable from the cell phone charging port 252a.

In some implementations, an example use of the circuitry 300 for the cell phone case 200 with charging port 200a illumination comprises securely attaching the circuitry 300 to the cell phone case 200.

In some implementations, the method comprises securely attaching the piece of material 210 to the cell phone case 200.

The circuitry 300 is intended to generally illustrate the functionality of the cell phone case. One of ordinary skill in the art with the benefit of this invention would know how to make circuitry having the functionality described herein.

The figures, including photographs and drawings, comprised herewith may represent one or more implementations of a cell phone case that illuminates a cell phone charging port.

Details shown in the figures, such as dimensions, descriptions, etc., are exemplary, and there may be implementations of other suitable details according to the present disclosure.

Reference throughout this specification to "an embodiment" or "implementation" or words of similar import means that a particular described feature, structure, or characteristic is comprised in at least one embodiment of the present invention. Thus, the phrase "in some implementations" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

While operations may be depicted in the drawings in a particular order, this should not be understood as requiring that such operations be performed in the particular order shown or in sequential order, or that all illustrated operations be performed, to achieve desirable results.

The invention claimed is:

1. A cell phone case comprising:
a case having an inner side and outer side wherein the case is configured to securely house a cell phone within its inner side wherein the case comprises a back panel configured to cover the back of the cell phone when the cell phone is housed in the case and a side wall extending from the back panel toward the inner side of the case wherein the side wall comprises a charging port opening configured to provide access through the changing port opening to a charging port of the cell phone when the cell phone is housed in the case wherein the charging port opening is configured to at least partially surrounds the charging port of the cell phone when the cell phone is housed in the case; and
circuitry comprising a battery, a switch, and a light emitting diode (LED) electrically connected together so that the battery powers the LED to emit light when the switch is operated wherein the circuitry is embodied in the back panel of the case and wherein the LED is positioned in the back panel of the case so that the light emitted from the LED is directed from within the back panel of the cell phone case toward the inner side of the side wall to illuminate the charging port opening, wherein the portion of the case containing the circuitry and side wall comprising the charging port opening are removably attached to the case on a removable panel.

2. The cell phone case of claim 1, wherein the circuitry is positioned within the back panel of the case adjacent to the charging port opening.

3. The cell phone case of claim 1, wherein the circuitry is composed on an inner surface of the removable panel.

4. The cell phone case of claim 1, wherein the switch is configured to operate by pressing the switch through the back panel of the case.

5. The cell phone case of claim 1, wherein the switch is a tactile switch.

6. The cell phone case of claim 1 wherein the circuitry further comprises a timer electrically connected to the circuitry and configured to turn off the LED at a preset amount of time after the LED is turned on by the circuitry.

7. The cell phone case of claim 1 wherein the switch is a pushbutton switch.

8. A method of using the cell phone case of claim 1, the method comprising:
placing a cell phone in the case and
causing the circuitry to power the LED to illuminate the charging port opening by pressing the switch.

9. The cell phone case of claim 1, wherein the removable panel is a removable slot.

* * * * *